United States Patent
Sprigg (10) Patent No.: US 9,684,306 B2
(45) Date of Patent: Jun. 20, 2017

(54) TRANSITIONING FROM AUTONOMOUS VEHICLE CONTROL TO OPERATOR VEHICLE CONTROL

(71) Applicant: QUALCOMM Incorporated, San Diego, CA (US)

(72) Inventor: Stephen Alton Sprigg, Poway, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 14/988,807

(22) Filed: Jan. 6, 2016

(65) Prior Publication Data

US 2016/0202700 A1 Jul. 14, 2016

Related U.S. Application Data

(60) Provisional application No. 62/101,421, filed on Jan. 9, 2015.

(51) Int. Cl.
*G05D 1/00* (2006.01)
*B60Q 9/00* (2006.01)
*B60W 30/00* (2006.01)

(52) U.S. Cl.
CPC ............ *G05D 1/0061* (2013.01); *B60Q 9/00* (2013.01); *B60W 30/00* (2013.01); *G05D 1/0088* (2013.01); *G05D 2201/0213* (2013.01)

(58) Field of Classification Search
CPC .... G05D 1/0061; G05D 1/0088; G05D 1/021; B60Q 9/00
USPC .......................................................... 701/23
See application file for complete search history.

(56) References Cited

U.S. PATENT DOCUMENTS

| 8,565,997 | B2 | 10/2013 | Kindo et al. | |
|---|---|---|---|---|
| 2014/0088814 | A1* | 3/2014 | You ...................... | G05D 1/0061 701/23 |
| 2014/0148988 | A1 | 5/2014 | Lathrop et al. | |
| 2014/0156133 | A1* | 6/2014 | Cullinane ............. | B60W 30/00 701/23 |
| 2014/0303827 | A1* | 10/2014 | Dolgov ................. | B60W 30/00 701/23 |

FOREIGN PATENT DOCUMENTS

| JP | 2012051441 A | 3/2012 |
|---|---|---|
| WO | 2006047297 A2 | 5/2006 |

OTHER PUBLICATIONS

International Search Report and Written Opinion—PCT/US2016/012418—ISA/EPO—Jun. 30, 2016.

* cited by examiner

*Primary Examiner* — Yazan Soofi
(74) *Attorney, Agent, or Firm* — Smith Tempel Blaha LLC (57) ABSTRACT

A method for transitioning vehicle control includes obtaining a one or more operator vehicle control inputs, analyzing the one or more operator vehicle control inputs to determine operator compliance with one or more autonomous vehicle control inputs that are actively controlling motion of a vehicle, and based on the analysis of the one or more operator vehicle control inputs, allowing an operator to assume manual control of the vehicle when the operator vehicle control inputs match the one or more autonomous vehicle control inputs to within a threshold value.

20 Claims, 6 Drawing Sheets

FIG. 6

TRANSITIONING FROM AUTONOMOUS VEHICLE CONTROL TO OPERATOR VEHICLE CONTROL

RELATED APPLICATIONS

This application claims the benefit of U.S. Provisional Patent Application No. 62/101,421, entitled "Transitioning From Autonomous Vehicle Control To Operator Vehicle Control," filed Jan. 9, 2015, the contents of which are hereby incorporated by reference in their entirety.

DESCRIPTION OF THE RELATED ART

The development of automatically or autonomously controlled vehicles is continuing. An autonomously controlled vehicle is one that can be controlled by a computer or a computer-based control system with little or no manual operator input. When applied to a vehicle, such as an automobile, it is contemplated that it will be desirable to switch between manual operator control and autonomous control. This switching between manual operator control and autonomous control typically comprises two events: switching from operator control to autonomous control, and switching from autonomous control to operator control, with these two events having different challenges. Switching from operator control to autonomous control typically requires the autonomous control system to have the ability to confirm the ability to assume control of the vehicle in a safe and stable manner. This typically includes some type of automated verification system to confirm that the autonomous control system is capable of safely controlling the vehicle.

In many ways, switching from autonomous control to manual operator control is more difficult than switching from manual operator control to autonomous control because it is difficult for the autonomous control system to verify that the operator has the ability to assume control of the vehicle in a safe and stable manner.

Therefore, it would be desirable for an autonomous control system to be able to quickly and efficiently verify that the operator has the ability to assume control of the vehicle in a safe and stable manner and to then transition control to the operator.

SUMMARY

Various implementations of systems, methods and devices within the scope of the appended claims each have several aspects, no single one of which is solely responsible for the desirable attributes described herein. Without limiting the scope of the appended claims, some prominent features are described herein.

Details of one or more implementations of the subject matter described in this specification are set forth in the accompanying drawings and the description below. Other features, aspects, and advantages will become apparent from the description, the drawings, and the claims. Note that the relative dimensions of the following figures may not be drawn to scale.

One aspect of the disclosure provides a method for transitioning vehicle control, the method including obtaining one or more operator vehicle control inputs, analyzing the one or more operator vehicle control inputs to determine operator compliance with one or more autonomous vehicle control inputs that are actively controlling motion of a vehicle, and based on the analysis of the one or more operator vehicle control inputs, allowing an operator to assume manual control of the vehicle when the one or more operator vehicle control inputs match the one or more autonomous vehicle control inputs to within a threshold value.

Another aspect of the disclosure provides an apparatus for transitioning vehicle control, the apparatus including an operator tracking module configured to obtain one or more operator vehicle control inputs, and a comparison module configured to analyze the one or more operator vehicle control inputs to determine operator compliance with one or more autonomous vehicle control inputs that actively control motion of a vehicle, the comparison module configured to, based on the analysis of the one or more operator vehicle control inputs, allow an operator to assume manual control of the vehicle when the one or more operator vehicle control inputs match the one or more autonomous vehicle control inputs to within a threshold value.

Another aspect of the disclosure provides a method for transitioning a vehicle from autonomous control to operator control, the method including autonomously controlling a vehicle, obtaining one or more operator vehicle control inputs, comparing the one or more operator vehicle control inputs against autonomous vehicle control inputs that are actively controlling motion of the vehicle to determine operator compliance with the one or more autonomous vehicle control inputs, and based on the determined operator compliance with the one or more autonomous vehicle control inputs that are actively controlling motion of the vehicle, transitioning vehicle control from autonomous control to operator control.

BRIEF DESCRIPTION OF THE DRAWINGS

In the figures, like reference numerals refer to like parts throughout the various views unless otherwise indicated. For reference numerals with letter character designations such as "102*a*" or "102*b*", the letter character designations may differentiate two like parts or elements present in the same figure. Letter character designations for reference numerals may be omitted when it is intended that a reference numeral encompass all parts having the same reference numeral in all figures.

DETAILED DESCRIPTION

The word "exemplary" is used herein to mean "serving as an example, instance, or illustration." Any aspect described herein as "exemplary" is not necessarily to be construed as preferred or advantageous over other aspects.

In this description, the term "application" may also include files having executable content, such as: object code, scripts, byte code, markup language files, and patches. In addition, an "application" referred to herein, may also include files that are not executable in nature, such as documents that may need to be opened or other data files that need to be accessed.

As used in this description, the terms "component," "database," "module," "system," and the like are intended to refer to a computer-related entity, either hardware, firmware, a combination of hardware and software, software, or software in execution. For example, a component may be, but is not limited to being, a process running on a processor, a processor, an object, an executable, a thread of execution, a program, and/or a computer. By way of illustration, both an application running on a computing device and the computing device may be a component. One or more components may reside within a process and/or thread of execution, and a component may be localized on one computer and/or distributed between two or more computers. In addition, these components may execute from various computer readable media having various data structures stored thereon. The components may communicate by way of local and/or remote processes such as in accordance with a signal having one or more data packets (e.g., data from one component interacting with another component in a local system, distributed system, and/or across a network such as the Internet with other systems by way of the signal).

As used herein, the term "vehicle" includes any type of vehicle that is typically controlled by an operator, and which may be controlled by an autonomous vehicle control system. By way of example, the term "vehicle" may include an automobile, a boat or ship, an airplane, or any other vehicle.

As used herein, the term "operator" refers to an individual operating a vehicle. An operator may be a driver of an automobile, a captain or pilot of a boat, a captain or pilot of an airplane, or any other vehicle operator.

As used herein, the terms "automated vehicle control" and "autonomous vehicle control" refer to any automated or autonomous vehicle control system that can operate a vehicle without operator input.

Figure 1:
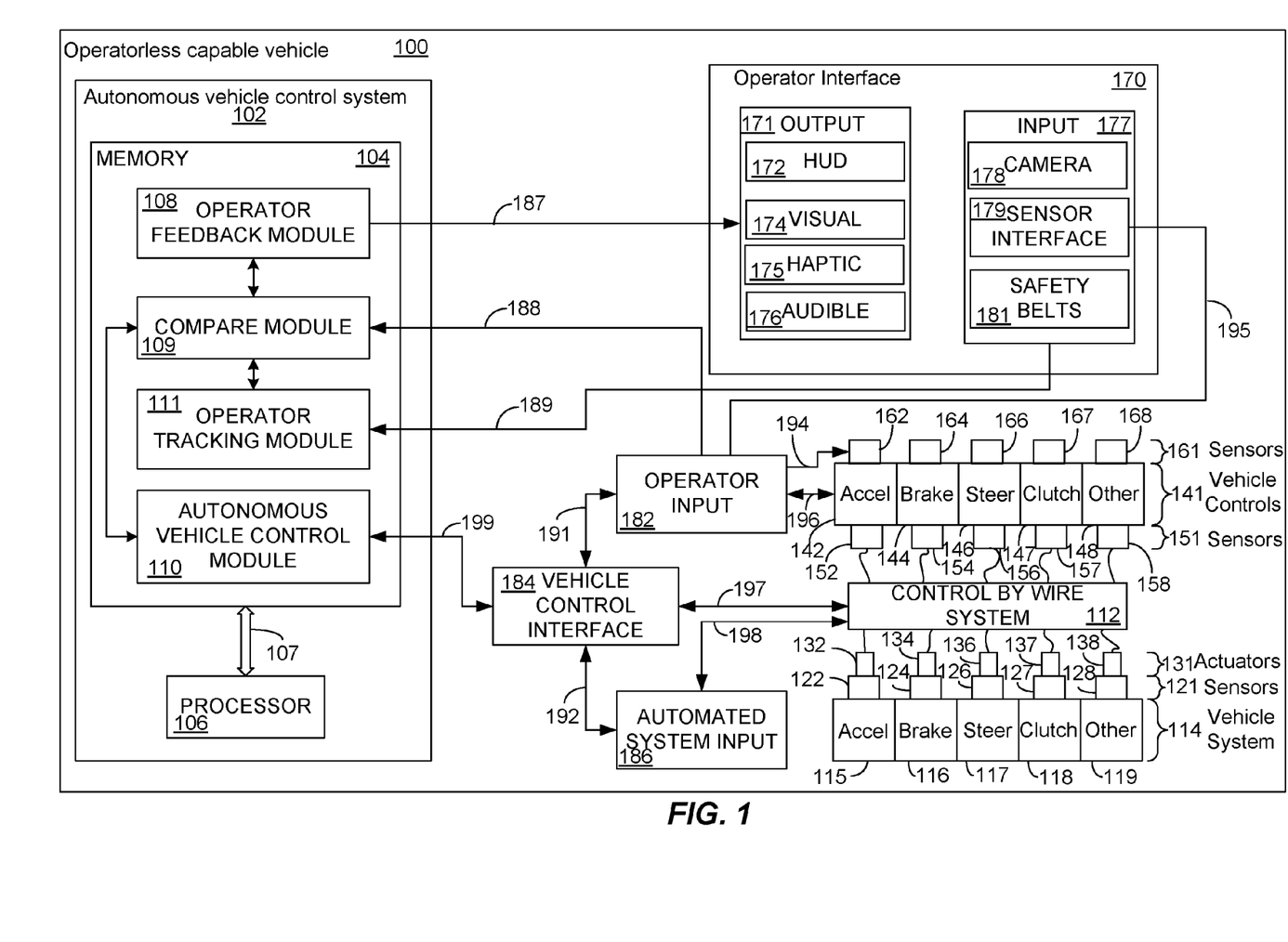
FIG. 1 is a block diagram illustrating an exemplary embodiment of an operatorless capable vehicle in which a system for switching from autonomous vehicle control to operator vehicle control can be implemented.

FIG. 1 is a block diagram illustrating an exemplary embodiment of an operatorless capable vehicle (referred to below as "vehicle") 100 in which a system for transitioning from autonomous vehicle control to operator vehicle control can be implemented.

In an exemplary embodiment, the vehicle 100 comprises an autonomous vehicle control system 102 and an operator interface 170. In an exemplary embodiment, the autonomous vehicle control system 102 comprises a processor 106 and a memory 104 operatively coupled together over a system bus 107. The processor 106 can be a general purpose processor or a special purpose processor configured to execute instructions stored in the memory 104. The processor 106 may also contain on-board memory (not shown), and may comprise distributed computing functionality.

In an exemplary embodiment, the memory 104 may contain one or more sets of code or executable instructions or modules. In an exemplary embodiment, the memory 104 may comprise an autonomous vehicle control module 110, an operator tracking module 111, a compare module 109 and an operator feedback module 108. Each of the autonomous vehicle control module 110, the operator tracking module 111, the compare module 109 and the operator feedback module 108 may comprise elements of hardware, software, or a combination of hardware and software configured to perform certain tasks as described herein.

In an exemplary embodiment, the operator interface 170 comprises an output element 171 configured to provide output communications to an operator of the vehicle 100, and an input element 177 configured to provide inputs to the autonomous vehicle control system 102. The output element 171 may comprise a heads up display (HUD) 172, a visual element 174, a haptic element 175, and an audible element 176. The HUD 172 can be configured to display, project or otherwise place into the visual path of an operator information related to the vehicle 100. In an exemplary embodiment, the HUD 172 can be configured to visually communicate to an operator the manner in which the operator may be mimicking or tracking the performance of the autonomous vehicle control system 102 as the autonomous vehicle control system 102 is controlling the operation of the vehicle.

Similarly, the visual element 174 and the audible element 176 can be configured to visually and audibly communicate to an operator the manner in which the operator may be mimicking or tracking the performance of the autonomous vehicle control system 102 as the autonomous vehicle control system 102 is controlling the operation of the vehicle. The haptic element 175 may provide haptic feedback to an operator to communicate the manner in which the operator may be mimicking or tracking the performance of the autonomous vehicle control system 102 as the autonomous vehicle control system 102 is controlling the operation of the vehicle.

The input element 177 may comprise a camera 178, a sensor interface 179 and a safety belt module 181. In an exemplary embodiment, the camera 178 may comprise one or more still or video cameras configured to observe an operator of the vehicle 100 and communicate this information to the operator tracking module 111. In an exemplary embodiment, the sensor interface 179 can be configured to receive information from one or more sensors on the vehicle 100 and communicate the state of the sensors to the operator tracking module 111. In an exemplary embodiment, the safety belt module 181 can be configured to receive information from one or more safety systems on the vehicle 100 and communicate the state of the safety systems to the operator tracking module 111. An output of the input element 177, including the outputs from the sensor interface 179, are provided to the operator tracking module 111 over connection 189.

The vehicle 100 comprises vehicle systems 114 and vehicle controls 141. The vehicle systems 114 may comprise the actual vehicle systems, such as the accelerator 115, the brake 116, the steering 117, the clutch 118, and other systems 119. In an exemplary embodiment, the vehicle systems 114 are the actual vehicle systems, not the controls for those systems. For example, the accelerator 115 may comprise the powertrain of the vehicle 100 that is responsible for propulsion. Similarly, the brake 116 may comprise the braking system of the vehicle responsible for slowing and stopping the vehicle 100.

Sensors 121 are associated with each of the vehicle systems 114. For example, a sensor 122 is associated with the accelerator 115, a sensor 124 is associated with the brake 116, a sensor 126 is associated with the steering 117, a sensor 127 is associated with the clutch 118, and a sensor 128 is associated with the other systems 119. Each of the sensors 121 can be configured to determine and communicate the state of its respective vehicle system to a control by wire system (referred to as a drive by wire system in the context of an automobile) 112. The control by wire system 112 receives electronic control inputs from various vehicle controls, and provides signals used to operate the vehicle systems 114, generally through actuators 131. For example, an actuator 132 is associated with the sensor 122 and the accelerator 115. In an exemplary embodiment, the actuator 132 receives a control signal from the control by wire system 112 and provides a signal that causes the accelerator 115 to control the speed of the vehicle 100. The associated sensor 122 monitors both the vehicle system (the accelerator 115 in this example), and the actuator 132 and provides information to the sensor interface 179 (connection not shown in FIG. 1). Similarly, an actuator 134 is associated with the sensor 124 and the brake 116. In an exemplary embodiment, the actuator 134 receives a control signal from the control by wire system 112 and provides a signal that causes the brake 116 to control the slowing and/or stopping of the vehicle 100. The associated sensor 124 monitors both the vehicle system (the brake 116 in this example), and the actuator 134 and provides information to the sensor interface 179. Similarly, an actuator 136 is associated with the sensor 126 and the steering 117. In an exemplary embodiment, the actuator 136 receives a control signal from the control by wire system 112 and provides a signal that causes the steering 117 to control the direction of the vehicle 100. The associated sensor 126 monitors both the vehicle system (the steering 117 in this example), and the actuator 136 and provides information to the sensor interface 179. Similarly, an actuator 137 is associated with the sensor 127 and the clutch 118. In an exemplary embodiment, the actuator 137 receives a control signal from the control by wire system 112 and provides a signal that causes the clutch 118 to engage or disengage drive power to the vehicle 100. The associated sensor 127 monitors both the vehicle system (the clutch 118 in this example), and the actuator 137 and provides information to the sensor interface 179. Similarly, an actuator 138 is associated with the sensor 128 and the other systems 119.

The vehicle controls 141 are also coupled to the control by wire system 112 through the sensors 151. The vehicle controls 141 are the control systems that receive the control inputs from an operator. For example, the accelerator 142 can be the accelerator pedal of the vehicle 100 that is configured to be operated by the operator's foot. Similarly, the brake 144 can comprise the brake pedal of the vehicle 100 that is configured to be operated by the operator's foot. Similarly, the steering wheel 146 can be the steering wheel of the vehicle 100 that is configured to be operated by the operator's hands; the clutch 147 can be the clutch pedal of the vehicle 100 that is configured to be operated by the operator's foot; and the other control 148 can be any other vehicle control.

The sensor 152 is associated with the accelerator 142, the sensor 154 is associated with the brake 144, the sensor 156 is associated with the steering wheel 146, the sensor 157 is associated with the clutch 147 and the sensor 158 is associated with the other controls 148. The sensors 151 provide a respective control input to the control by wire system to translate the operator-provided vehicle controls to the actual vehicle systems 114.

Sensors 161 are also associated with respective vehicle controls 141. The sensor 162 is associated with the accelerator 142, the sensor 164 is associated with the brake 144, the sensor 166 is associated with the steering wheel 146, the sensor 167 is associated with the clutch 147 and the sensor 168 is associated with the other controls 148.

The vehicle 100 also comprises an operator input module 182, a vehicle control interface 184 and an automated system input module 186. In an exemplary embodiment, the operator input module 182 represents the manual operator inputs provided to the vehicle 100 when the vehicle is under manual operator control, or when the vehicle is under autonomous control and manual operator inputs are being compared against the autonomous control inputs to determine the manner in which a manual operator is mimicking the autonomous vehicle control prior to the autonomous vehicle control module 110 relinquishing control to a manual operator. As such, the operator input module 182 is operatively coupled to the vehicle controls 141 over connection 196, is operatively coupled to the sensors 161 over connection 194, and is operatively coupled to the compare module 109 over connection 188. In an exemplary embodiment, the sensors 161 receive respective inputs from the operator input module 182 and provide an output to the sensor interface 179 (connection not shown in FIG. 1).

The vehicle control interface 184 is operatively coupled to the control by wire system 112 over connection 197, and is operatively coupled to the operator input module 182 over connection 191, and to the automated system input module 186 over connection 192. The vehicle control interface 184 is also operatively coupled to the autonomous vehicle control module 110 over connection 199.

Autonomous Mode

When the vehicle 100 is operating in autonomous mode, the autonomous vehicle control module 110 controls the vehicle 100 by sending control signals to the vehicle control interface 184, which in turn provides control signals to the control by wire system 112. The control by wire system 112 provides the inputs to the vehicle systems 114 through the actuators 131 and the sensors 121 to autonomously operate the vehicle 100. The automated system input module 186 monitors the control by wire system 112 over connection 198 and provides information as to how the vehicle is performing over connection 192 to the vehicle control interface 184. The vehicle control interface 184 provides this information over connection 199 to the autonomous vehicle control system 110, which also provides this information to the compare module 109.

Transition from Autonomous Mode to Manual Mode

When the vehicle 100 is operating in autonomous mode and it is desirable to switch to manual operator mode, the autonomous vehicle control module 110 continues to control the vehicle 100 as described above. However, as an operator begins engaging the vehicle controls 141, the operator input module 182, together with the sensors 161 begin sensing, recording and providing the manual inputs to the sensor interface 179 over connection 195. Moreover, the sensor interface 179, the camera 178 and the safety belt module 181 also provide inputs to the operator tracking module 111.

The operator tracking module 111 receives inputs from the input element 177 regarding the manual inputs provided by the operator. The operator tracking module 111 also provides this information to the compare module 109. In this manner, the compare module 109 receives the automated inputs used to autonomously operate the vehicle 100 by the autonomous vehicle control system 110, and also receives the manual inputs provided to the vehicle 100 by the manual operator attempting to mimic the autonomous vehicle control. However, at this time, the manual inputs provided to the vehicle 100 by the manual operator are not being used to actually control the vehicle 100, but instead, are directed to the compare module 109 for comparison against the autonomous vehicle control inputs.

The compare module 109 compares the manner in which the manual inputs provided by the manual operator are mimicking, or copying the automated inputs provided to the vehicle 100 by the autonomous vehicle control system 110, and provides an output to the operator feedback module 108. Depending on the manner in which the manual inputs provided by the manual operator are mimicking, or copying the automated inputs provided by the autonomous vehicle control system 110, the operator feedback module 108 provides an output over connection 187 to the output module 171. For example, if the manual inputs provided by the manual operator are not mimicking, or copying the automated inputs provided by the autonomous vehicle control system 110 to within a predetermined threshold, then one or more of the HUD 172, visual element 174, haptic element 175 and the audible element 176 can be used to communicate to the manual operator that the manual operator is not following the automated inputs at a level and accuracy at which control of the vehicle 100 can be transitioned to the manual operator. Conversely, if the manual inputs provided by the manual operator are mimicking, or accurately copying the automated inputs provided by the autonomous vehicle control system 110 to within the predetermined threshold, then one or more of the HUD 172, visual element 174, haptic element 175 and the audible element 176 can be used to communicate to the manual operator that the manual operator is following the automated inputs at a level and accuracy at which control of the vehicle 100 can be transitioned to the manual operator.

Figure 2:
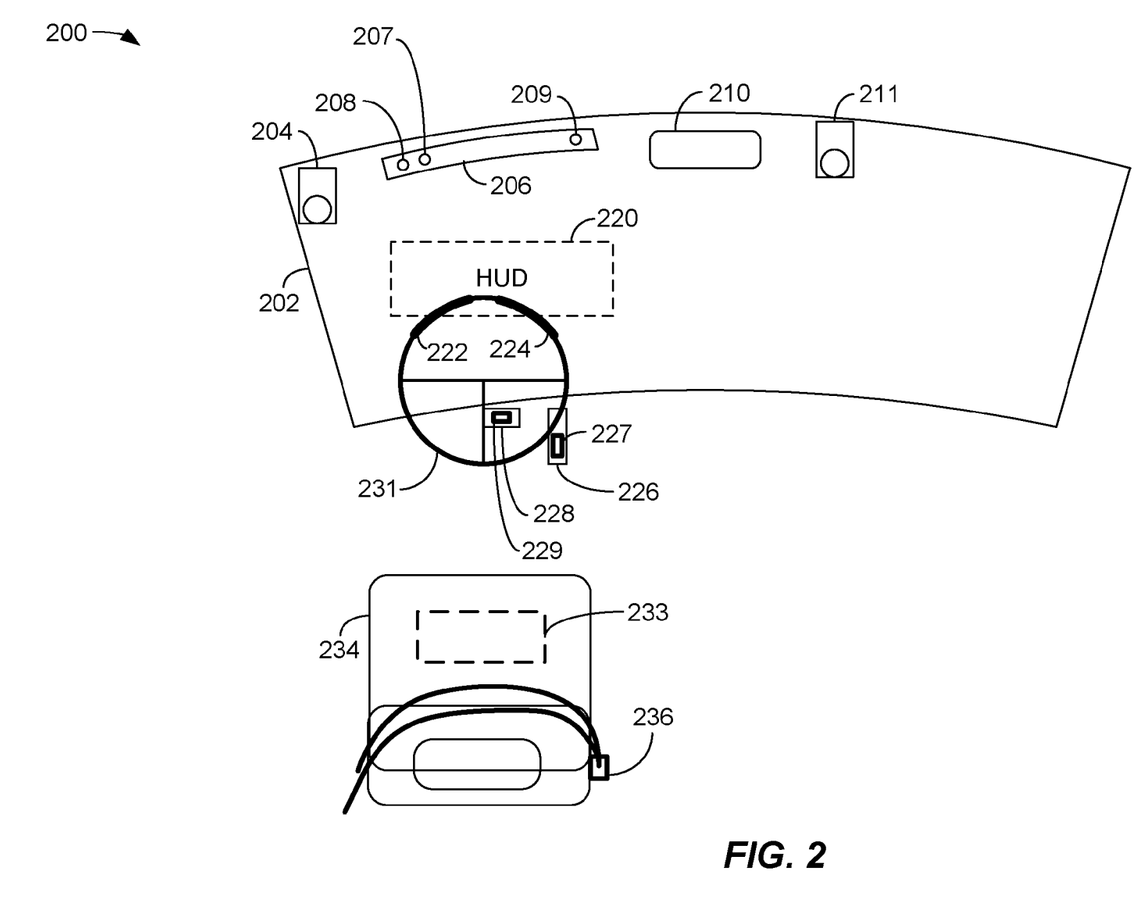
FIG. 2 is a diagram illustrating an exemplary embodiment of the operator interface of FIG. 1.

FIG. 2 is a diagram illustrating an exemplary embodiment of the operator interface of FIG. 1. Elements of the operator interface can be integrated into a vehicle. For example, an operator interface for an automobile may include, cameras 204 and 211, lights 207 and 208, a speaker 209, and a HUD 220. In an exemplary embodiment, the cameras 204 and 211, lights 207 and 208, speaker 209, and the HUD 220 are shown relative to a vehicle windshield 202 and a vehicle seat 234. A steering wheel 231 may include sensors 222 and 224 to sense the position of and contact with the steering wheel 231 of an operator's hands. An accelerator pedal 226 may include a sensor 227 to sense the position and/or pressure of the user's foot on the accelerator pedal 226. Similarly, a brake pedal 228 may include a sensor 229 to sense the position and/or pressure of the user's foot on the brake pedal 228. A seat belt buckle and sensor 236 may be implemented to sense whether the operator has their seat belt buckled. A haptic feedback element 233, such as, for example only, a vibratory element, may be located in the seat 234 to provide haptic feedback to the operator. More or fewer of the elements shown in FIG. 2, and other elements, may be implemented, depending on application.

Figure 3:
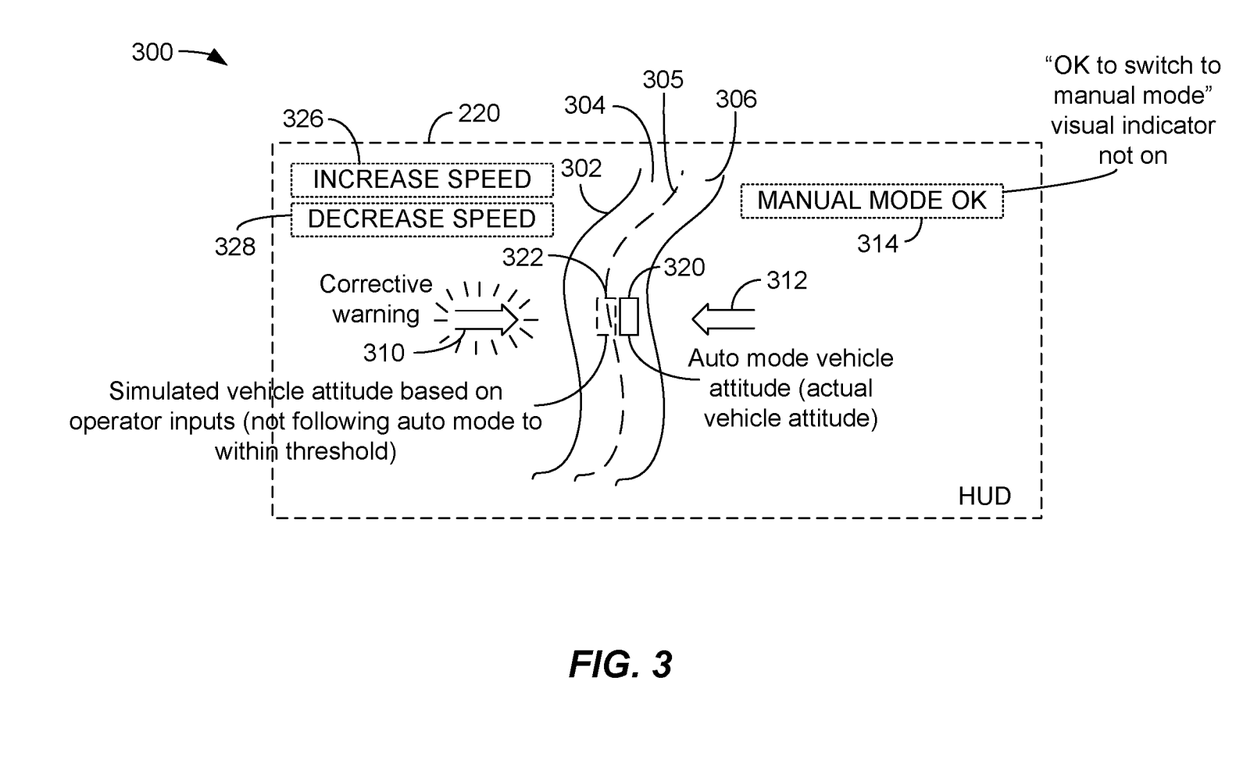
FIG. 3 is a diagram illustrating an exemplary embodiment of a heads up display of FIGS. 1 and 2.

FIG. 3 is a diagram 300 illustrating an exemplary embodiment of a heads up display of FIGS. 1 and 2. In an exemplary embodiment, the operator feedback module 108 (FIG. 1) may generate control signals that cause the HUD 220 to display an image of a road 302 having travel lanes 304 and 306. In this exemplary embodiment, the travel lane 306 can be the direction of travel of the vehicle 100 and the travel lane 304 may be for vehicles traveling in the opposite direction. An image of an automobile 320 may be displayed on the HUD 220 in the lane 306. In an exemplary embodiment, the image 320 represents the vehicle 100 traveling in the lane 306 being autonomously controlled by the autonomous vehicle control module 110 (FIG. 1) represented by the image of the automobile 320. An image of an automobile 322 may also be displayed on the HUD 220. In an exemplary embodiment, the image 322 represents the vehicle 100 being manually controlled by an operator seeking to transition the vehicle 100 from autonomous control to manual control. The image of the automobile 322 straddling the centerline 305 indicates that the manual user inputs are insufficient to cause the vehicle 100 to mimic the control of the vehicle 100 provided by the autonomous vehicle control module 110 (FIG. 1) indicating that transitioning from autonomous control to manual control should not be permitted. In such a situation, visual and/or audible feedback can be communicated to the operator from the operator feedback module 108 (FIG. 1) alerting the operator that they are not adequately controlling the vehicle 100 in such a way that the autonomous vehicle control module 110 would transition control to the manual operator. In this exemplary embodiment, visual operator feedback providing a corrective warning is provided to the operator on the HUD 220 in the form of a flashing arrow 310 informing the operator that they should control the vehicle 100 so as to cause the vehicle 100 to move to the right, that is, away from the centerline 305 and toward the center of the travel lane 306. In this exemplary embodiment, the operator feedback module 108 (FIG. 1) causing the non-flashing arrow 312 to flash would inform the operator to control the vehicle 100 to move to the left.

Figure 4:
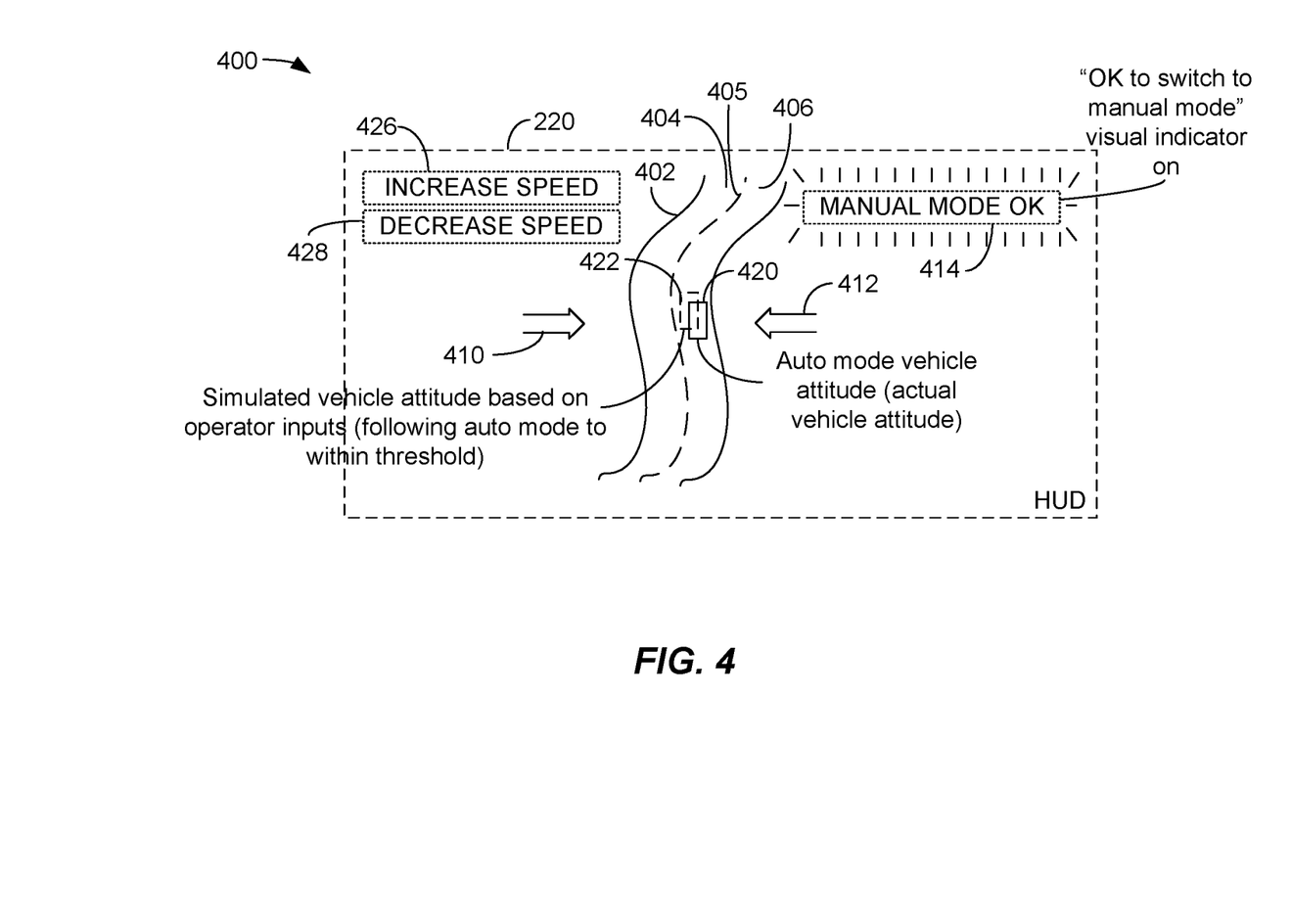
FIG. 4 is a diagram illustrating an exemplary embodiment of a heads up display of FIG. 1.

FIG. 4 is a diagram 400 illustrating an exemplary embodiment of a heads up display of FIG. 1. In an exemplary embodiment, the operator feedback module 108 (FIG. 1) may generate control signals that cause the HUD 220 to display an image of a road 402 having travel lanes 404 and 406. In this exemplary embodiment, the travel lane 406 can be the direction of travel of the vehicle 100 and the travel lane 404 may be for vehicles traveling in the opposite direction. An image of an automobile 420 may be displayed on the HUD 220 in the lane 406. In an exemplary embodiment, the image 420 represents the vehicle 100 traveling on the lane 406 being autonomously controlled by the autonomous vehicle control module 110 (FIG. 1). An image of an automobile 422 may also be displayed on the HUD 220. In an exemplary embodiment, the image 422 represents the vehicle 100 being manually controlled by an operator seeking to transition the vehicle 100 from autonomous control to manual control. In the embodiment shown in FIG. 4, the operator has acted in response to the flashing arrow 310 (FIG. 3) such that the image of the automobile 422 is no longer straddling the centerline 405 and indicates that the manual user inputs are now sufficient to cause the vehicle 100 to more closely mimic the control of the vehicle 100 provided by the autonomous vehicle control module 110 (FIG. 1) to within a threshold within which control of the vehicle may be transitioned from the autonomous vehicle control module 110 (FIG. 1) to the operator. In this exemplary embodiment, neither the arrow 410 nor the arrow 412 is flashing. In this exemplary embodiment, visual operator feedback is now provided to the operator on the HUD 220 in the form of a flashing indicator 414 informing the operator that they are now allowed to switch the vehicle 100 to manual control. Although the example of FIGS. 3 and 4 uses steering as the only input, it should be mentioned that any number of control factors may be analyzed by the compare module 109 in determining whether manual operator input is sufficient to control the vehicle. For example, the HUD 220 may include an "increase speed" indicator 326 and 426 as a visual warning to the operator that they are not driving fast enough, and may include a "decrease speed" indicator 328 and 428 as a visual warning to the operator that they are driving too fast. Other indicators are also possible.

Figure 5:
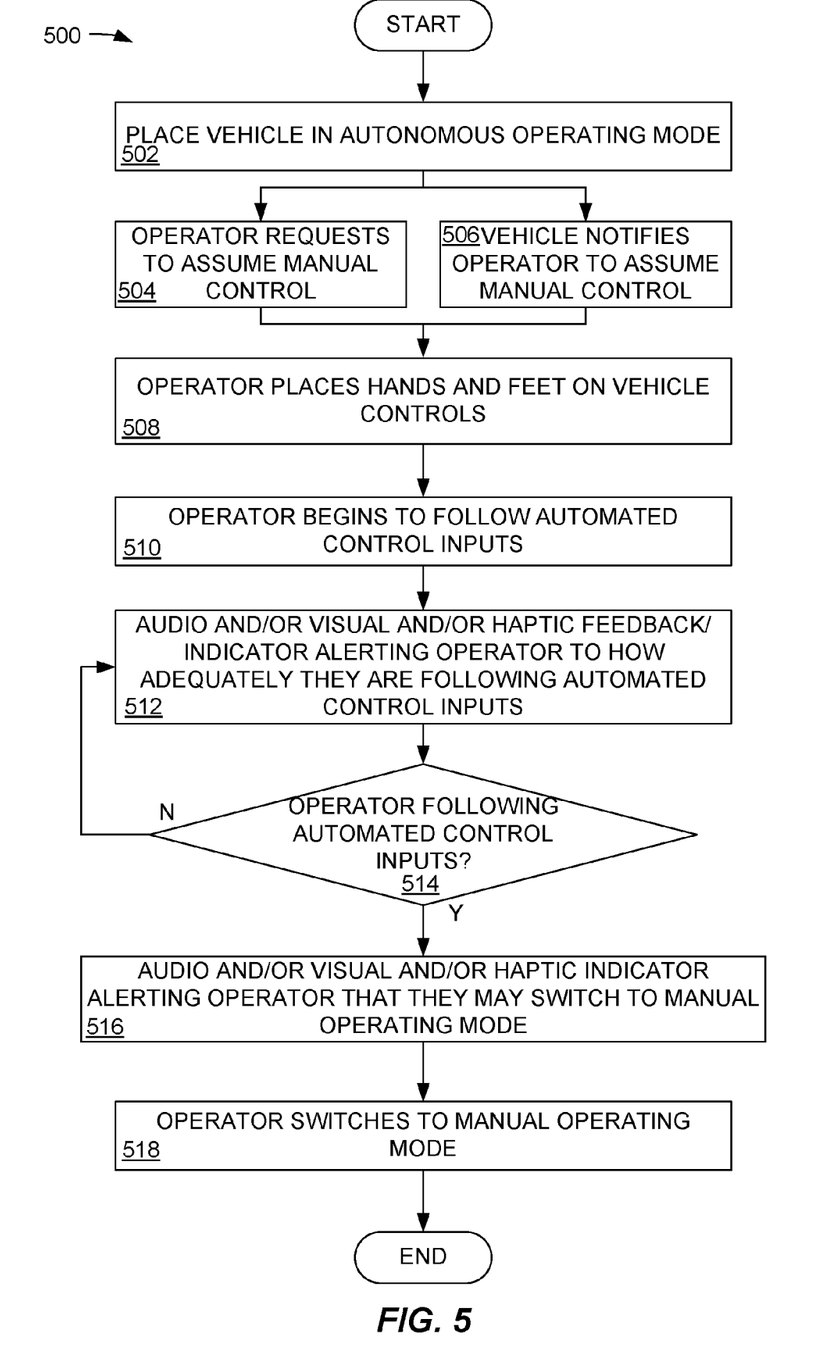
FIG. 5 is a flow chart illustrating an exemplary embodiment of a method for transitioning from autonomous vehicle control to operator vehicle control.

FIG. 5 is a flow chart illustrating an exemplary embodiment of a method for transitioning from autonomous vehicle control to operator vehicle control. The blocks in the method 500 can be performed in or out of the order shown. In an exemplary embodiment, the method 500 described in FIG. 5 can be performed by an instance of the autonomous vehicle control system 102 of FIG. 1.

In block 502, the vehicle is placed in or is previously located in autonomous driving mode.

In block 504, the operator requests to assume manual control of the vehicle 100. Alternatively, in block 506, the autonomous vehicle control system 102 alerts the operator that they should assume manual control of the vehicle 100.

In block 508, the operator places their hands on the steering wheel, foot on the accelerator, brake, etc.

In block 510, the operator actuates the controls to "mimic" or "match" the automated control inputs provided by the autonomous vehicle control module 110 (FIG. 1).

In block 512, audio and/or visual and/or haptic feedback and/or indicators (which in an exemplary embodiment may be similar to those in a video game) provide the operator with visual, audible and haptic feedback as to whether their motions are closely approximating those of the autonomous vehicle control module 110 to within a predefined threshold. This could take the form of active control feedback, a heads-up display (HUD), lights, chimes, haptic feedback, etc. These prompts continue to provide feedback to the operator as to the areas of manual control (steering, accelerator, etc.) that do not adequately match the inputs of the autonomous vehicle control module 110 to within a predefined threshold.

In block 514, it is determined whether the operator is adequately following the inputs of the autonomous vehicle control module 110 to within a threshold. If the operator is not adequately following the inputs of the autonomous vehicle control module 110, the process returns to block 512 and the operator continues to receive feedback. The predefined threshold to be measured may comprise one or more measurable parameters such as vehicle location, speed, direction, etc. For example, referring to FIGS. 3 and 4, the predefined threshold may be the accuracy with which the manual operator controls the vehicle to be within the travel lane 306 and 406 and away from the centerline 305 and 405. Moreover, the predefined threshold may change or vary based on various changing conditions, such as changing ambient conditions, changing road conditions, changing weather conditions, or other changing conditions. For example, the predefined threshold may be different on a clear day than on a rainy night.

If it is determined in block 514 that the operator is adequately following the inputs of the autonomous vehicle control module 110 to within the threshold, then, in block 516, an audio and/or visual and/or haptic confirmation may alert the operator that they can transition to manual mode.

In block 518, the operator switches to manual mode by way of a verbal confirmation, button press, etc., and assumes manual control of the vehicle.

Figure 6:
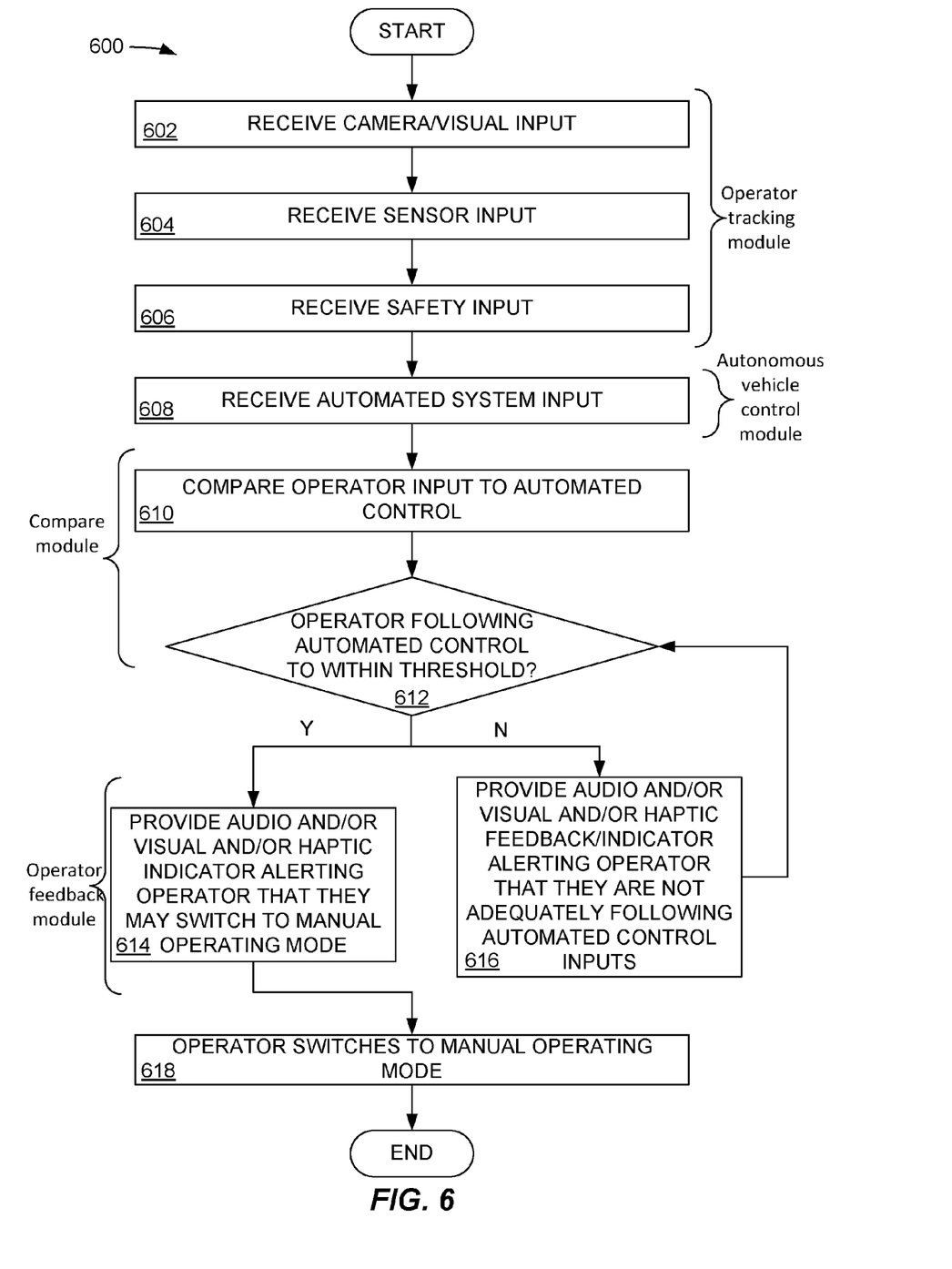
FIG. 6 is a flow chart illustrating an exemplary embodiment of a method for executing the compare function of FIG. 5.

FIG. 6 is a flow chart illustrating an exemplary embodiment of a method for executing the compare function of FIG. 5. The blocks in the method 600 can be performed in or out of the order shown. The method 600 described in FIG. 6 can be performed by an instance of the autonomous vehicle control system 102 of FIG. 1.

In blocks 602, 604 and 606, the operator tracking module 111 (FIG. 1) receives camera/visual input (block 602), sensor input (block 604 and safety input (block 606) from the input module 177.

In block 608, the autonomous vehicle control module 110 provides automated system input to the compare module 109.

In block 610, the compare module 109 compares the automated system input against the manual operator input.

In block 612, it is determined whether the operator is adequately following the inputs of the autonomous vehicle control module 110 to within the threshold. If the operator is not adequately following the inputs of the autonomous vehicle control module 110 to within the threshold, the process proceeds to block 616 where the operator feedback module 108 provides audio and/or visual and/or haptic feedback alerting the operator that they are not adequately following the automated control inputs.

If it is determined in block 612 that the operator is adequately following the inputs of the autonomous vehicle control module 110 to within the threshold, then, in block 614, an audio and/or visual and/or haptic confirmation alerts the operator that they can transition to manual mode.

In block 618, the operator switches to manual mode by way of a verbal confirmation, button press, etc., and assumes manual control of the vehicle.

In view of the disclosure above, one of ordinary skill in programming is able to write computer code or identify appropriate hardware and/or circuits to implement the disclosed invention without difficulty based on the flow charts and associated description in this specification, for example. Therefore, disclosure of a particular set of program code instructions or detailed hardware devices is not considered necessary for an adequate understanding of how to make and use the invention. The inventive functionality of the claimed computer implemented processes is explained in more detail in the above description and in conjunction with the FIGS. which may illustrate various process flows.

In one or more exemplary aspects, the functions described may be implemented in hardware, software, firmware, or any combination thereof. If implemented in software, the functions may be stored on or transmitted as one or more instructions or code on a computer-readable medium. Computer-readable media include both computer storage media and communication media including any medium that facilitates transfer of a computer program from one place to another. A storage media may be any available media that may be accessed by a computer. By way of example, and not limitation, such computer-readable media may comprise RAM, ROM, EEPROM, CD-ROM or other optical disk storage, magnetic disk storage or other magnetic storage devices, or any other medium that may be used to carry or store desired program code in the form of instructions or data structures and that may be accessed by a computer.

Also, any connection is properly termed a computer-readable medium. For example, if the software is transmitted from a website, server, or other remote source using a coaxial cable, fiber optic cable, twisted pair, digital subscriber line ("DSL"), or wireless technologies such as infrared, radio, and microwave, then the coaxial cable, fiber optic cable, twisted pair, DSL, or wireless technologies such as infrared, radio, and microwave are included in the definition of medium.

Disk and disc, as used herein, includes compact disc ("CD"), laser disc, optical disc, digital versatile disc ("DVD"), floppy disk and Blu-Ray disc where disks usually reproduce data magnetically, while discs reproduce data optically with lasers. Combinations of the above should also be included within the scope of computer-readable media.

Although selected aspects have been illustrated and described in detail, it will be understood that various substitutions and alterations may be made therein without departing from the spirit and scope of the present invention, as defined by the following claims.

What is claimed is:

1. A method for transitioning vehicle control, the method comprising:
    obtaining one or more operator vehicle control inputs;
    analyzing the one or more operator vehicle control inputs to determine operator compliance with one or more autonomous vehicle control inputs that are actively controlling motion of a vehicle by comparing the one or more operator vehicle control inputs against the one or more autonomous vehicle control inputs; and
    based on the analysis and comparison of the one or more operator vehicle control inputs against the one or more autonomous vehicle control inputs, allowing an operator to assume manual control of the vehicle when the one or more operator vehicle control inputs match the one or more autonomous vehicle control inputs to within a threshold value.

2. The method of claim 1, further comprising providing to the operator any of visual, audible or haptic indicators indicative of the operator compliance with the one or more autonomous vehicle control inputs that are actively controlling motion of the vehicle.

3. The method of claim 2, wherein the visual indicator is provided on a heads up display.

4. The method of claim 2, wherein the visual indicator is provided by a light.

5. The method of claim 2, wherein the audible indicator is provided by a speaker.

6. The method of claim 2, wherein the haptic indicator is provided by a vibratory element.

7. The method of claim 1, wherein the threshold value is predefined.

8. The method of claim 1, wherein the threshold value is variable based on a changing condition.

9. The method of claim 8, wherein the changing condition is any of a road condition or a weather condition.

10. An apparatus for transitioning vehicle control, the apparatus comprising:
    an operator tracking module configured to execute instructions on a processor, the operator tracking module configured to obtain one or more operator vehicle control inputs; and
    a comparison module configured to execute instructions on a processor, the comparison module configured to analyze the one or more operator vehicle control inputs to determine operator compliance with one or more autonomous vehicle control inputs that actively control motion of a vehicle by comparing the one or more operator vehicle control inputs against the one or more autonomous vehicle control inputs, the comparison module configured to, based on the analysis and comparison of the one or more operator vehicle control inputs against the one or more autonomous vehicle control inputs, allow an operator to assume manual control of the vehicle when the one or more operator vehicle control inputs match the one or more autonomous vehicle control inputs to within a threshold value.

11. The apparatus of claim 10, further comprising an output element configured to provide any of visual, audible or haptic indicators indicative of the operator compliance with the one or more autonomous vehicle control inputs that actively control motion of the vehicle.

12. The apparatus of claim 11, further comprising a heads up display configured to provide the visual indicator.

13. The apparatus of claim 11, further comprising a light configured to provide the visual indicator.

14. The apparatus of claim 11, further comprising a speaker configured to provide the audible indicator.

15. The apparatus of claim 11, further comprising a vibratory element configured to provide the haptic indicator.

16. The apparatus of claim 10, wherein the threshold value is predefined.

17. The apparatus of claim 16, wherein the threshold value is variable based on a changing condition.

18. The apparatus of claim 17, wherein the changing condition is any of a road condition or a weather condition.

19. A method for transitioning a vehicle from autonomous control to operator control, the method comprising:
    autonomously controlling a vehicle;
    obtaining one or more operator vehicle control inputs;
    comparing the one or more operator vehicle control inputs against autonomous vehicle control inputs that are actively controlling motion of the vehicle to determine operator compliance with the one or more autonomous vehicle control inputs; and
    based on the determined operator compliance with the one or more autonomous vehicle control inputs that are actively controlling motion of the vehicle, transitioning vehicle control from autonomous control to operator control.

20. The method of claim 19, wherein transitioning vehicle control from autonomous control to operator control comprises:
    transitioning vehicle control from autonomous control to operator control when the operator vehicle control inputs match the autonomous vehicle control inputs to within a predefined threshold value, the predefined threshold value based on a changing condition selected from any of a changing ambient condition, a changing road condition or a changing weather condition.

* * * * *